United States Patent
Hull et al.

[11] Patent Number: 5,116,107
[45] Date of Patent: May 26, 1992

[54] PNEUMATIC BRAKING SYSTEM FOR TRACTOR AND TRAILER

[76] Inventors: Harold L. Hull, 401 Canyon Way #43; Terrence W. Stevenson, 401 Canyon Way #40, both of Sparks, Nev. 89434

[21] Appl. No.: 552,569

[22] Filed: Jul. 3, 1990

[51] Int. Cl.$^5$ .............................................. B60T 8/22
[52] U.S. Cl. ..................................... 303/7; 303/9.73; 303/40; 303/54
[58] Field of Search .................... 303/9.73, 9.62, 7, 8, 303/9, 44, 47, 33, 22.1, 54, 40, 28

[56] References Cited

U.S. PATENT DOCUMENTS

| | | | |
|---|---|---|---|
| 3,085,835 | 4/1963 | Alfieri | 303/53 |
| 3,747,992 | 7/1973 | Schnipke | 303/40 |
| 3,790,807 | 2/1974 | Rossigno | 303/7 |
| 3,951,464 | 4/1976 | Donahue et al. | 303/2 X |
| 3,992,064 | 11/1976 | Carton et al. | 303/7 |
| 4,003,605 | 1/1977 | Fannin | 303/6.01 |
| 4,131,324 | 12/1978 | Kurichh | 303/7 |
| 4,175,588 | 11/1979 | Gute | 137/625.4 |
| 4,210,368 | 7/1980 | Sontheimer | 303/3 |
| 4,324,436 | 4/1982 | Reinecke | 303/22.1 |
| 4,418,965 | 12/1983 | Reinecke | 303/22.1 |
| 4,641,846 | 2/1987 | Ehrhart | 280/80 B |
| 4,726,626 | 2/1988 | Angelillo | 303/22.1 |

Primary Examiner—Matthew C. Graham

[57] ABSTRACT

A pneumatic braking system for a tractor and trailer which delivers air to the trailer substantially first and in a greater amount than to the tractor but which continues to deliver to the tractor until the pressure at the tractor approaches the pressure at the trailer. This gives better control and substantially avoids jack-knifing. A valve is also provided to lessen the time factor of air to the tractor when a greater braking pressure is applied. Also when "bob-tailing" only substantially 50% of air is delivered to the tractor to prevent over-braking.

14 Claims, 2 Drawing Sheets

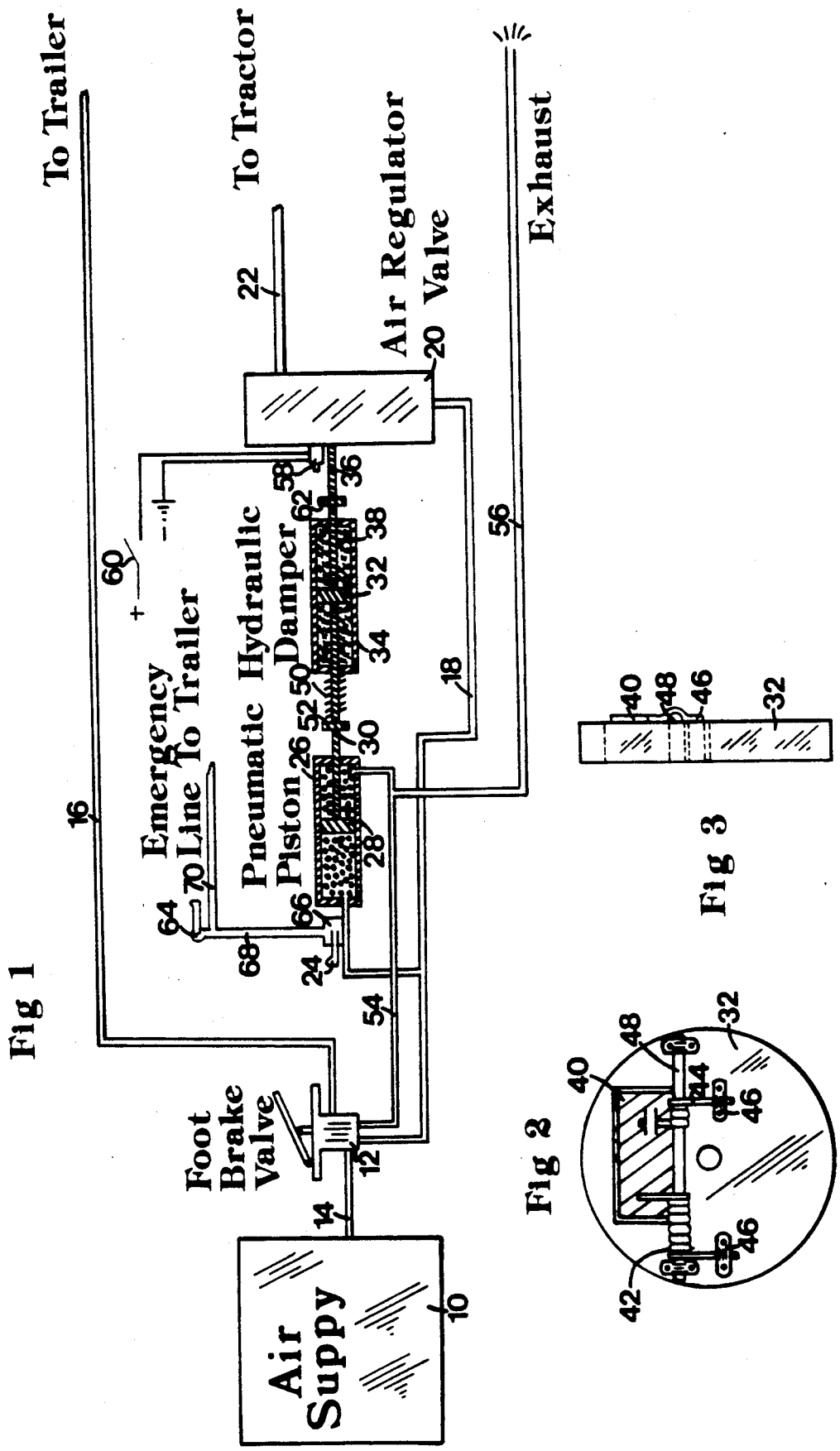

PNEUMATIC BRAKING SYSTEM FOR TRACTOR AND TRAILER

FIELD OF THE INVENTION

This invention relates to braking systems and more particularly to pneumatic braking system for use with a tractor and trailer unit to improve the working relationship between the tractor and trailer in that the improvement automatically applies braking to the trailer ahead of the tractor to better prevent side-swiping, jack-knifing, etc.

BACKGROUND OF THE INVENTION

A number of brake systems have been proposed in the past that use an air supply controlled through a foot valve and/or hand valve which delivers air to the tractor-trailer unit in either an in-line system or a sequential system. The system that has been most successful in the past has been a combination foot and hand valve which allows the operator to individually control the trailer brakes independent of the tractor brakes on demand, however, the system requires the coordination of hand and foot of the operator and a more desirable arrangement has been sought which leaves no decision to the operator but which automatially delivers air to the trailer ahead of the tractor.

Another problem involved is the various load requirements of the trailer which can vary from empty to maximum and changes the braking characteristics of the trailer. This problem has been addressed by numerous patents and is commonly referred to and partially solved by the use of "load-controlled" or "load-sensing" valves such as Pat. No. 4,418,965 or Pat. No. 4,324,436.

Yet another problem to be addressed is the amount of air delivered to the tractor in relation to the amount of air delivered to the trailer which can be controlled at all levels of air-pressure and the manner in which the air-pressure is delivered automatically under all circumstances.

Still another problem exists due to the different distances involved of the tractor and trailer from the source of air supply via the foot or hand valve. If the tractor and trailer is "in-line", the air is delivered first to the tractor and then to the trailer which can cause serious problems. This problem is addressed by various devices such as Pat. No. 3,747,992 which electro-pneumatic system and has to due primarily with response time.

Another important problem with conventional systems is the use of the "jake brake" which only breaks the tractor and can cause under certain conditions, jack-knifing, skidding of the trailer, etc.

These and other problems are addressed by the present invention which eliminates many components and provides additional advantages not heretofore available.

SUMMARY OF THE INVENTION

Therefore, a primary object of the present invention is to provide a pneumatic braking system which is automatic and requires no operator decisions.

Another object is to provide a braking system which will provide air-pressure to the trailer ahead of the tractor.

Still another object is to provide air-pressure to the trailer ahead of the tractor at a pressure exceeding that of the tractor.

Yet another object is to provide air to the tractor at substantially the same time as air is delivered to the trailer but in a lessor amount.

Another object is to provide air to the tractor in a delayed but increasing mode over a controlled time period.

Still another object is to provide air to the tractor in a delayed but increasing mode over a controlled time period which is shortened when the pressure is higher.

Another important object is to use the exhaust air to assist a quick return of the system.

Still another object is to substantially prevent skidding and jack-knifing by applying the latter part of the air supply to the tractor in a smooth manner as opposed to a sudden burst of air supply.

Another important object is to provide means, activated by the shut-off valve going to the trailer, to shut off part of the air pressure going to the tractor which in a conventional system remains at 100% which can cause over braking by the operator, when "bob-tailing". (Operating without a trailer.)

It is another object to provide means under sustained braking (such as a long down-hill grade) to maintain more air supply to the trailer than to the tractor.

Yet another object is to provide means under sustained braking (such as a long down-hill grade) to maintain air pressure on the tractor to nearly the same pressure as on the trailer, which is not the case in many systems which put the main braking load on the trailer which may cause over heating and early burnout of the trailer brakes.

Still another object is to provide a quick exhaust assist return to allow the operator to release the brakes intermittently such as every two or three seconds, thus applying substantially 50% more braking to the trailer than to the tractor such as is desirable under slippery situations such as ice, snow or rain conditions. This practice is currently, recommended driver procedure in order to release an inadvertent locked wheel unknown to the driver.

A further object is to provide a braking system which can apply 100% of air to the trailer and substantially less to the tractor (such as 70%) when the "jake-brake" is activated, thus allowing the use of a conventional "jake-brake" which under certain circumstances such as winter driving is not recommended with the present systems as this can cause jack-knifing or skidding, but with the present invention, activation of the "jake-brake" can be used with a greater margin of safety.

Other objects and advantages will become apparent during the course of the following description when taken in consideration with the accompanying drawings.

BRIEF DESCRIPTION OF THE DRAWINGS

FIG. 1 is a plan view of the braking system.

FIG. 2 is a detail view of the preferred embodiment of a piston in the dampening device.

FIG. 3 is a side view of FIG. 2.

DETAILED DESCRIPTION OF THE DRAWINGS

Figure 4:
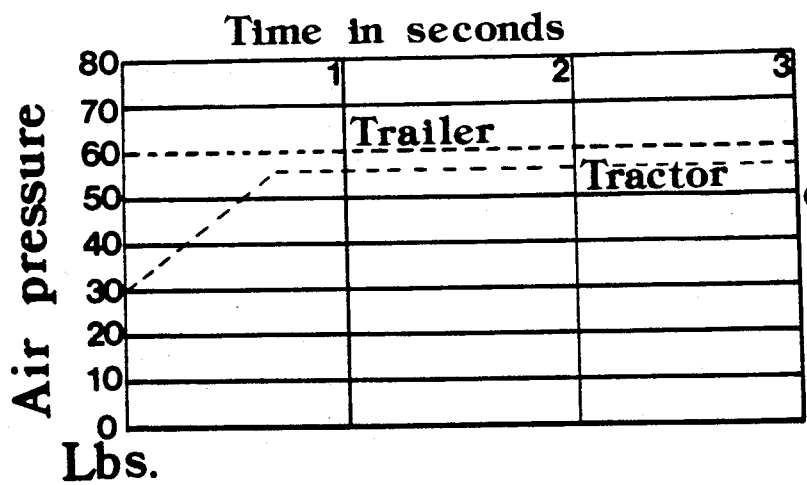
FIG. 4 is a chart showing the response time of the tractor and trailer when 60 lbs. of air pressure is applied.

Referring now in detail to the drawings wherein like numerals refer to like parts, 10 is an air supply while 12 is a conventional, foot operated, braking valve connected to air supply 10 by conduit 14 and on demand delivers air to the trailer through conduit 16 and to air-regulator valve 20 through conduit 18, 22 being a conduit to deliver air to the tractor. The foot valve also delivers air through conduit 24 to a pneumatic cylinder 26 which houses piston 28 while 30 is a push rod, connecting piston 28 with piston 32 which is housed by cylinder 34, piston 32 also being connected to a prior art standard air regulator valve which is well known in the art such as manufactured by BENDIX CORPORATION of Ilyria, Ohio and known as a TC-6 brake valve, maintenance kit P.C. No. 276122 with a graduated range of P.S.I. from 5 to 80 lbs., VMRS 13-010-014, or the TC-6 brake valve, maintenance kit P.C. No. 289890-VMRS 13-010-159 or the valve manufactured by MIDLAND/BERG of Rexdale, Ontario, O.E.M. Part No. E N30105B (80 P.S.I.) and these valves connected in a conventional manner such as a push rod 36 and the cylinder 34 being filled with suitable liquid such as hydraulic oil 38 which dampens the action of piston 32. FIGS. 2 and 3 show details of piston 32 with 40 being a flop valve maintained in a closed position when at rest in the piston 32 by a strong spring 42 and a weak spring 44, springs 42 and 44 being mounted by brackets 46 and flop valve 40 pivoting on shaft 48, while 50 is a spring mounted on push rod 30 and held in place on the push rod 30 by retainer 52. 54 is an exhaust conduit connected to foot valve 12 and the distal end of cylinder 26 and then to exhaust conduit 56. 58 is a solenoid, activated in conjunction with a conventional "jake brake" switch 60 and 62 is a stop which limits the travel of push rod 36. 64 is a trailer shut off valve generally located in the cab of the tractor which is connected to shut-off valve 66 by conduit 68 which shuts off the air supply to the trailer and 50% of the air supply to the tractor when "bob-tailing". This also acts as an emergency shut-off valve to the damper system in case of a fault in the damper system thus leaving 50% braking on the tractor, while 70 is a conduit leading to the trailer. Shut-off valve 66 may also be manually shut off to leave 100% air to the trailer and 50% air to the tractor.

In FIG. 7, 72 is a cover plate of regulator valve 20 while 74 are multiple bolts attaching plate 72 to frame 75 of regulator valve 20 with 76 being a connecting lever attached to rod 36 by connecting means 78 and end 80 of connecting lever 76. Lever 76 is pivotably connected at end 82 by mounting pin 84 and further connected to piston 86 by pin 88, piston 86 and spring 92 being slidably engaged in cylinder 90, spring 92 being in a compressed state and engaging piston 86 in a working relationship with diaphragm 94, via washer 96, washer 98 being engaged with spring 100 and diaphragm 94, spring 100 cooperating with spring 102 to keep piston 104 in a tensioned state between them. 106 is an air channel with 108 being an intake and 110 an exhaust, with 112 being an air channel in piston 104 which cooperates with air channel 106 and when air channel 112 in piston 104 is in alignment with air channel 106, air is exhausted through opening 110 and 114, 114 being an opening into air chamber 116, thus increasing the air pressure in chamber 116 and the exhaust work side, 110.

MODE OF OPERATION

It will now be seen that when the air regulator valve is set at some desirable pressure such as 50% of output to input, that when the foot valve is opened, air is immediately delivered to the trailer and the tractor with 100% going to the trailer while only 50% is delivered to the tractor, however, 100% air is delivered to the pneumatic cylinder 26 which forces piston 28 toward its distal end and piston 32 being connected to piston 28 is forced through the dampening hydraulic fluid in cylinder 34 and piston 32 also being connected to air regulator 20, over a timed period opens the air regulator to its maximum open allowable position as determined by the bottoming out of piston 32 or the limiting means of solenoid 58. The dampening effect of the hydraulic cylinder and piston is controlled in the preferred embodiment by flop valve 40 in piston 32 and this piston may be provided with different tensioned springs to change the response time. The pneumatic piston, hydraulic damper, air regulator, etc., may be housed in one casing (not shown) for convenience.

When the foot valve is returned to its normally closed position, the exhaust air escapes through conduit 54 and being in communication with the distal side of cylinder 26 gives the return spring 50 an air assist to return the piston to its starting position. The exhaust air gives the piston a "kick" in cooperation with spring 50 on its way to being exhausted through conduit 56.

It will now be readily seen that we have provided unusual results as the air pressure is always available at 100% to the trailer and always available at 50% to the tractor on demand and after the initial opening of the foot valve, the air to the tractor increases at a controlled rate until the air pressure of the tractor approaches the air pressure of the trailer.

Figure 5:
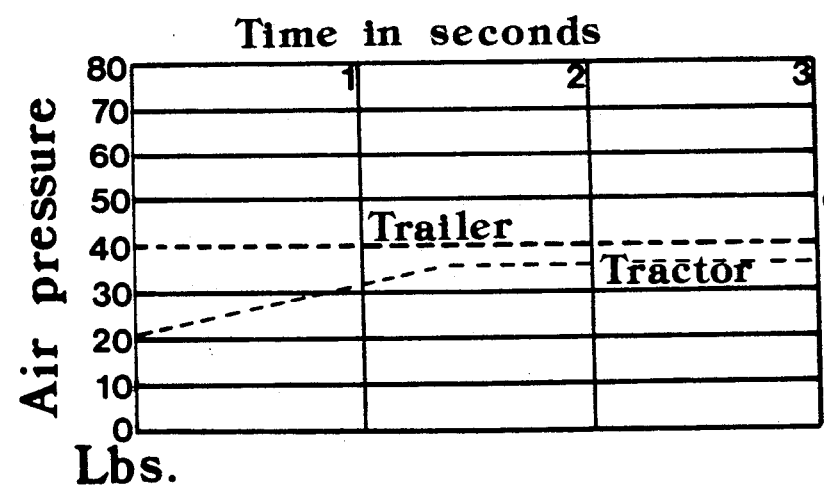
FIG. 5 is a chart showing the response time of the tractor and trailer when 40 lbs. of air pressure is applied.
Figure 6:
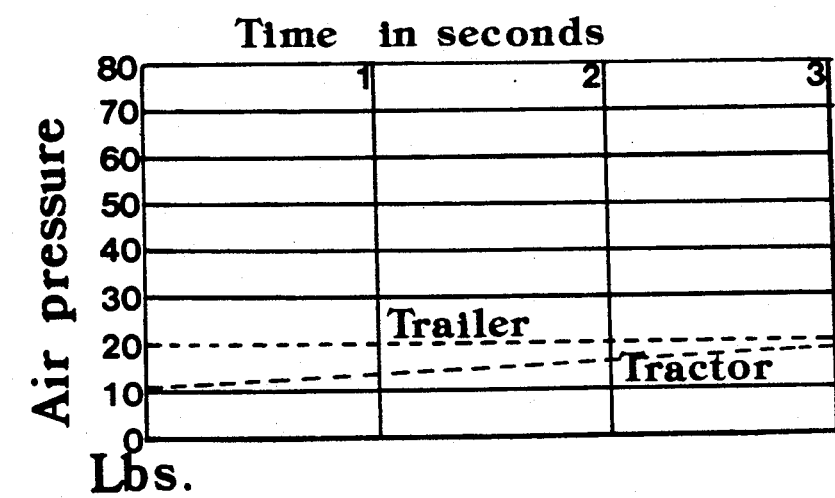
FIG. 6 is a chart showing the response time of the tractor and trailer when 20 lbs. of air pressure is applied.

As is illustrated by FIGS. 4, 5 and 6, the response time of the increased air to the tractor is shortened by the increase of pressure from the foot valve, so that on a slow stop such as in FIG. 6, the air to the tractor is substantially (a design choice) slower than that of a quicker stop as in FIG. 5 or a lock up, full brake stop as in FIG. 4. The response time in seconds to activate the tractor to its maximum air pressure is reduced from a 3 second interval at 20 lbs to less than 1 second at 60 lbs.

It will also be seen that we have provided a means to limit the stroke of push rod 36 which limits the increase of the air pressure to some desired lesser amount such as 70%. The embodiment shown is a solenoid which is activated by the "jake-brake" switch so that in operation when the "jake-brake" switch is activated the amount of air pressure released by the air regulator to the tractor is lessened substantially, automatically.

We have also provided a means to shut off a portion (50%) of brake pressure to the tractor when "bob-tailing" which in a conventional system stays at 100% and can cause over braking which is dangerous.

The variable factors, such as the initial difference in pressure to the tractor and trailer, the difference in the amount of pressure to the tractor and trailer at the end of the cycle, the dampening time cycle, the total response time in seconds, the solenoid stop, etc., are all designer choices and may be varied for different applications.

A number of dampening and other braking methods are well known and only one example is shown to illustrate the principle, with no attempt being made to explore all of the possible variations and modifications and has been presented and described in preferred form and by way of example only, and the invention is not intended to be limited to any particular form or embodiment except insofar as such limitations are expressly set forth in the claims.

What we claim and wish to secure by letters patent is:

1. A pneumatic braking system comprising; a source of compressed air, an air valve having a variable open position and a combination closed and exhaust position, said air valve being communicated to a trailer brake-applying means, a first housing defining a chamber therein, a piston slideably mounted in said chamber dividing the latter into first and second sections, said first section being communicated with said variable open position of said air valve, a second housing defining a chamber therein, a piston slideably mounted in said chamber dividing the latter into first and second sections, said first and second sections being filled with a viscous fluid, said first and second sections being communicated to provide a dampening means when said piston is urged from said first section to said second section, said piston of said first housing having attaching means to said piston of said second housing, an air regulator, means connecting said piston of said second chamber to said air regulator, said air regulator being communicated to said variable open position of said air valve, said air regulator being communicated to tractor brake-applying means, said attaching means of said pistons of said first and second chambers having a first and second position, means to return said attaching means from said second position to said first position, whereby, said source of compressed air, said air valve, said first housing with said slideable piston, said second housing with said slideable piston, said dampening means, said attaching means between said pistons, said return means of said attaching means, said air regulator, said trailer brake-applying means, said tractor brake-applying means, all cooperating together to form a braking system for supplying a variable source of air to said trailer brake-applying means and said tractor brake-applying means, receiving substantially less air pressure than said trailer brake-applying means when first activated and said pressure increasing over a time period to a near matching air pressure of said trailer brake-applying means.

2. The device of claim 1 including limiting means to limit the travel of said connecting means of said piston of said second housing to said air regulator.

3. The device of claim 2 in which said limiting means is a solenoid.

4. The device of claim 3 in which said solenoid is energized in connection with a "JAKE-BRAKE" switch.

5. The device of claim 1 in which said second section of said chamber of said first housing being communicated with said exhaust position of said air valve, whereby, exhaust air provides an assist to return said attaching means of said pistons from its said second position to its said first position.

6. The device of claim 1 in which communicating means between said air valve and said first section of said chamber of said first housing has shut-off means.

7. The device of claim 6 in which said shut-off means is activated in conjunction with an emergency shut-off valve to said trailer brake-applying means.

8. The device of claim 6 in which said shut-off means is manually operated.

9. The device of claim 1 in which said viscous fluid is hydraulic oil.

10. The device of claim 1 in which said means to communicate said first and second sections of said chamber of said second housing is a flop valve pivotably mounted on said piston of said second housing, said flop valve having means to provide a strong resistance of said viscous fluid when urged in one direction and means to provide a weak resistance to said viscous fluid when urged in an opposite direction, whereby, a dampeninq effect occurs in said direction which provides a strong resistance.

11. The device of claim 10 in which means to provide a strong resistance and a weak resistance are springs.

12. The device of claim 1 in which said attaching means from said piston of said first housing to said piston of said second housing is a rod.

13. The device of claim 1 in which said attaching means from said piston of said second housing to said air regulator is a rod.

14. The device of claim 1 in which said means to return said attaching means of said pistons from said second position to said first position is a spring.

* * * * *